United States Patent
Gerstel et al.

(10) Patent No.: US 7,181,138 B1
(45) Date of Patent: Feb. 20, 2007

(54) OPTICAL NETWORK CONNECTION TEST APPARATUS AND METHODS

(75) Inventors: Ornan A. Gerstel, New York, NY (US); Rajiv R. Ramaswami, Yorktown Heights, NY (US); Robert Ward, St. Charles, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 09/332,046

(22) Filed: Jun. 14, 1999

Related U.S. Application Data (60) Provisional application No. 60/112,506, filed on Dec. 14, 1998.

(51) Int. Cl.
*H04B 10/08* (2006.01)

(52) U.S. Cl. .............................. 398/33; 398/16; 398/27

(58) Field of Classification Search ................ 359/110, 359/152, 173, 187; 398/14, 30, 31, 32, 33, 398/34, 6, 16, 181, 27, 183; 370/248, 251, 370/252
See application file for complete search history.

(56) References Cited

U.S. PATENT DOCUMENTS

| | | | |
|---|---|---|---|
| 4,300,239 A | 11/1981 | Wakabayashi et al. | 455/601 |
| 4,850,045 A | 7/1989 | Funke | 455/607 |
| 4,887,309 A | 12/1989 | Andersson et al. | 455/601 |
| 5,060,224 A | 10/1991 | Konishi | 398/60 |
| 5,060,226 A * | 10/1991 | Gewin et al. | 370/244 |
| 5,150,243 A | 9/1992 | Suzuki | 359/110 |
| 5,212,713 A | 5/1993 | Frisch | 375/3.1 |
| 5,265,096 A * | 11/1993 | Parruck | 370/216 |
| 5,289,474 A * | 2/1994 | Purcell et al. | 714/716 |
| 5,367,395 A * | 11/1994 | Yajima et al. | 359/110 |
| 5,436,746 A | 7/1995 | Hirst | 359/110 |
| 5,619,489 A * | 4/1997 | Chang et al. | 370/241 |
| 5,717,795 A | 2/1998 | Sharma et al. | 385/24 |
| 5,790,287 A | 8/1998 | Darcie et al. | 359/110 |
| 5,825,515 A | 10/1998 | Anderson | 359/110 |
| 6,008,916 A * | 12/1999 | Khaleghi | 359/110 |
| 6,108,113 A * | 8/2000 | Fee | 398/16 |
| 6,115,157 A * | 9/2000 | Barnard et al. | 398/1 |
| 6,141,125 A | 10/2000 | Blair et al. | 398/32 |
| 6,356,367 B1 | 3/2002 | DeCusatis et al. | 398/5 |
| 6,452,701 B1 * | 9/2002 | Terahara et al. | 398/30 |
| 6,504,630 B1 * | 1/2003 | Czarnocha et al. | 398/15 |

* cited by examiner

*Primary Examiner*—Christina Y Leung
(74) *Attorney, Agent, or Firm*—Fitzpatrick, Cella, Harper & Scinto (57) ABSTRACT

A way of testing a wavelength division multiplexed (WDM) system without requiring connection to data source/sink equipment. A test signal is introduced onto a light path of interest in the system, and the test signal is monitored downstream for signal integrity. Lack of signal integrity is used to identify a fault in the lightpath. Alternatively, optical loopbacks may be used to localize and identify a fault in the lightpath. The lightpath includes a source optical node connected to a sink optical node via intermediate optical nodes. An optical signal introduced at the source node with a destination at the sink node may be looped back at any one of the intermediate nodes or the sink node to localize and identify a fault in the lightpath.

20 Claims, 8 Drawing Sheets

OPTICAL NETWORK CONNECTION TEST APPARATUS AND METHODS

CROSS-REFERENCE TO RELATED APPLICATIONS

This application claims the benefit of U.S. Provisional Application No. 60/112,506, filed Dec. 14, 1998.

FIELD OF THE INVENTION

The invention is in the field of optical telecommunications, and more particularly, pertains to detecting, isolating and localizing network transmission faults in a wavelength division multiplex (WDM) system.

BACKGROUND OF THE INVENTION

Wavelength division multiplexing is an approach for increasing the capacity of existing fiber optic networks. A WDM system employs plural optical signal channels, each channel being assigned a particular channel wavelength. In a WDM system optical signal channels are generated, multiplexed to form an optical signal comprised of the individual optical signal channels, transmitted over a single waveguide, and demultiplexed such that each channel wavelength is individually routed to a designated receiver.

A problem with many WDM systems is that they are not easily tested to determine optical transmission faults without first being connected to external data source/sink equipment such as client equipment. However, such connection makes it difficult to identify and localize transmission faults as being in the WDM system or the client equipment.

SUMMARY OF THE INVENTION

In view of the above, it is an aspect of the invention to test WDM systems without requiring connection to client equipment.

In another aspect of the invention a test signal is introduced in a lightpath of interest in WDM equipment, and the test signal is monitored downstream for system integrity. Detected lack of signal integrity is used to identify a fault in the lightpath of interest.

In a further aspect of the invention optical loopbacks are used in the WDM system to localize and identify faults in a lightpath. The lightpath originates at a source optical node connected to a sink optical node via intermediate optical nodes. The loopback is made at the sink node or at any intermediate node, without requiring conversion of the optical signal to an electrical signal.

These and other aspects and advantages of the invention will be apparent to those skilled in the art from the following detailed description.

DETAILED DESCRIPTION

Figure 1:
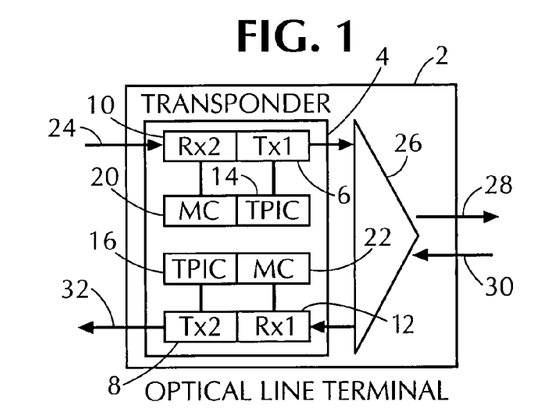
FIG. 1 is a schematic of a WDM optical line terminal according to the invention.

FIG. 1 is a schematic diagram of an optical node such as an optical line terminal (OLT) 2 which is used in a WDM system. WDM systems typically interface between a client equipment and an optical network through a transponder, which either converts a signal received from attached client equipment at a non-compatible wavelength into a wavelength that is suitable for use within the network, or converts a signal received from the network at a non-compatible wavelength into a wavelength that is suitable for use by attached client equipment.

OLT 2 includes a transponder 4 which has transmitters 6 and 8 and receivers 10 and 12. Test pattern injection circuits (TPIC) 14 and 16 cooperate with transmitters 6 and 8, respectively, and monitoring circuits (MC) 20 and 22 cooperate with receivers 10 and 12, respectively. A client equipment (not shown) provides a wavelength on line 24 to the receiver 10 with the wavelength then being transmitted by the transmitter 6 to a multiplexer/demultiplexer 26 which multiplexes the wavelength with other received wavelengths (not shown) and transmits the multiplexed wavelengths on a line 28 to a network (not shown). Multiplexed wavelengths received from the network on line 30 are demultilexed by the multiplexer/demultiplexer 26 and a wavelength is provided to the receiver 12 and then to the transmitter 8 for transmission to the client equipment via the line 32.

The testing of the OLT 2 and associated equipment is accomplished through use of the TPIC and MC associated with the respective transmitters and receivers. A test pattern from a TPIC is introduced into the transmitted signal at a transmitter, such as a line Alarm Indication Signal (AIS) test pattern that is implemented using overhead bytes of a transmitted SONET based signal. The MC circuit monitors received wavelengths using a bit error rate (BER) method, that is adapted to monitor the received test pattern to provide the self-testing that is an aspect of the present invention. This is described in more detail below.

Figure 2:
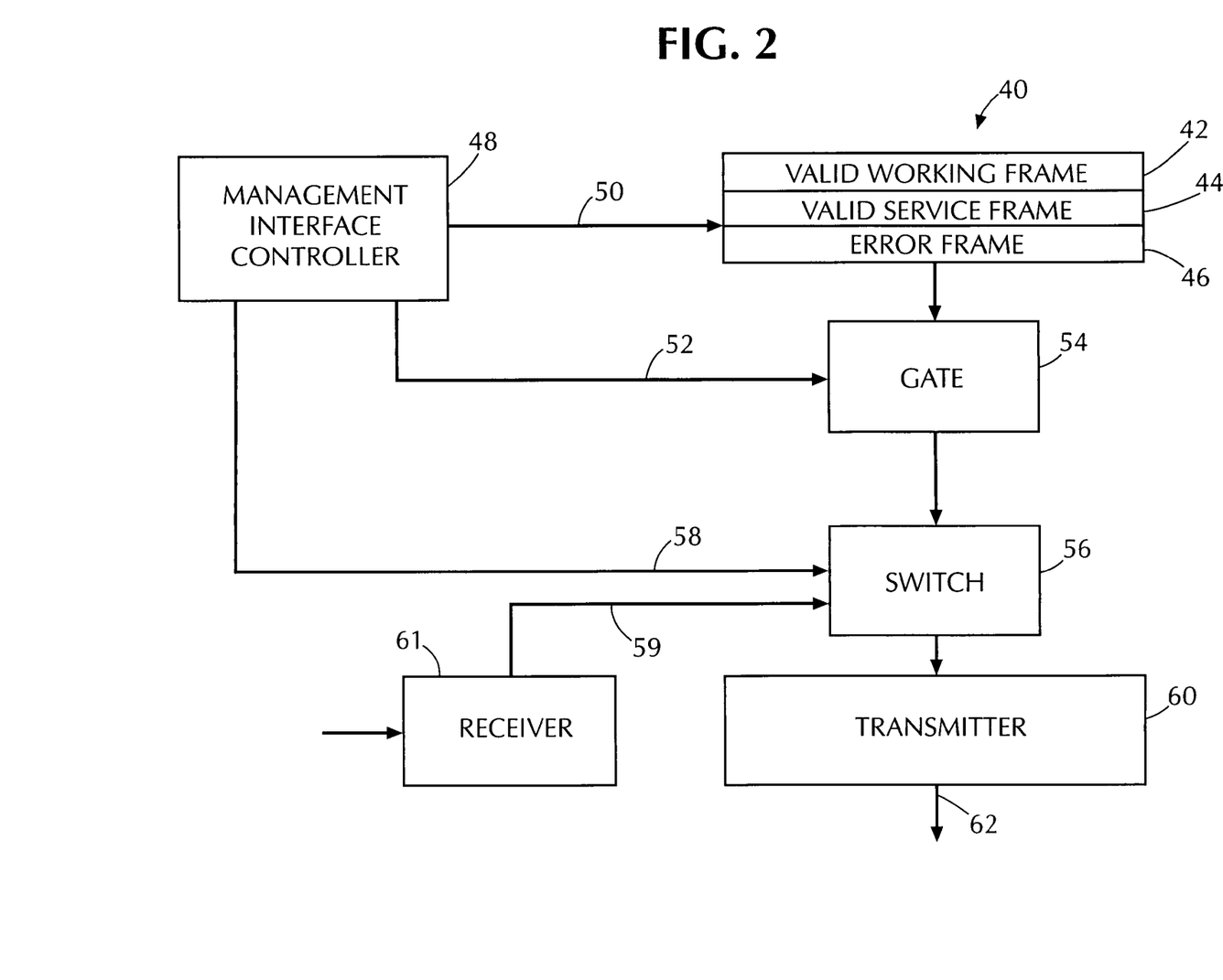
FIG. 2 is a block diagram of the test pattern injection circuit of FIG. 1.

FIG. 2 illustrates, inter alia, a TPIC in the transponder 4, such as the TPICs 14 and 16 of FIG. 1. A frame memory 40 stores a valid working frame 42, a valid service frame 44 and an error frame 46. Any one of these frames may be used as the test pattern (signal). A management interface controller 48 sends a select signal on a line 50 to the frame storage memory 40 to select one of the frames to be used as a test pattern. If the error frame 46 is selected, errors are introduced which are subsequently detected by a MC at the destination transponder. The selected frame is provided to a gate 54 which is enabled to pass the selected frame to a switch 56 in response to a command signal on line 52 from the management interface controller 48. The switch 56 passes the selected frame to a transmitter 60 in response to a read data signal on a line 58 from the management interface controller 48. During normal operation, the switch 56 is configured to pass a signal on line 59 from the receiver 61 to the transmitter 60. The transmitter 60 transmits the selected frame on a line 62 to a multiplexer/demultiplexer (not shown) and to the network for provision to a connected WDM equipment.

Figure 3:
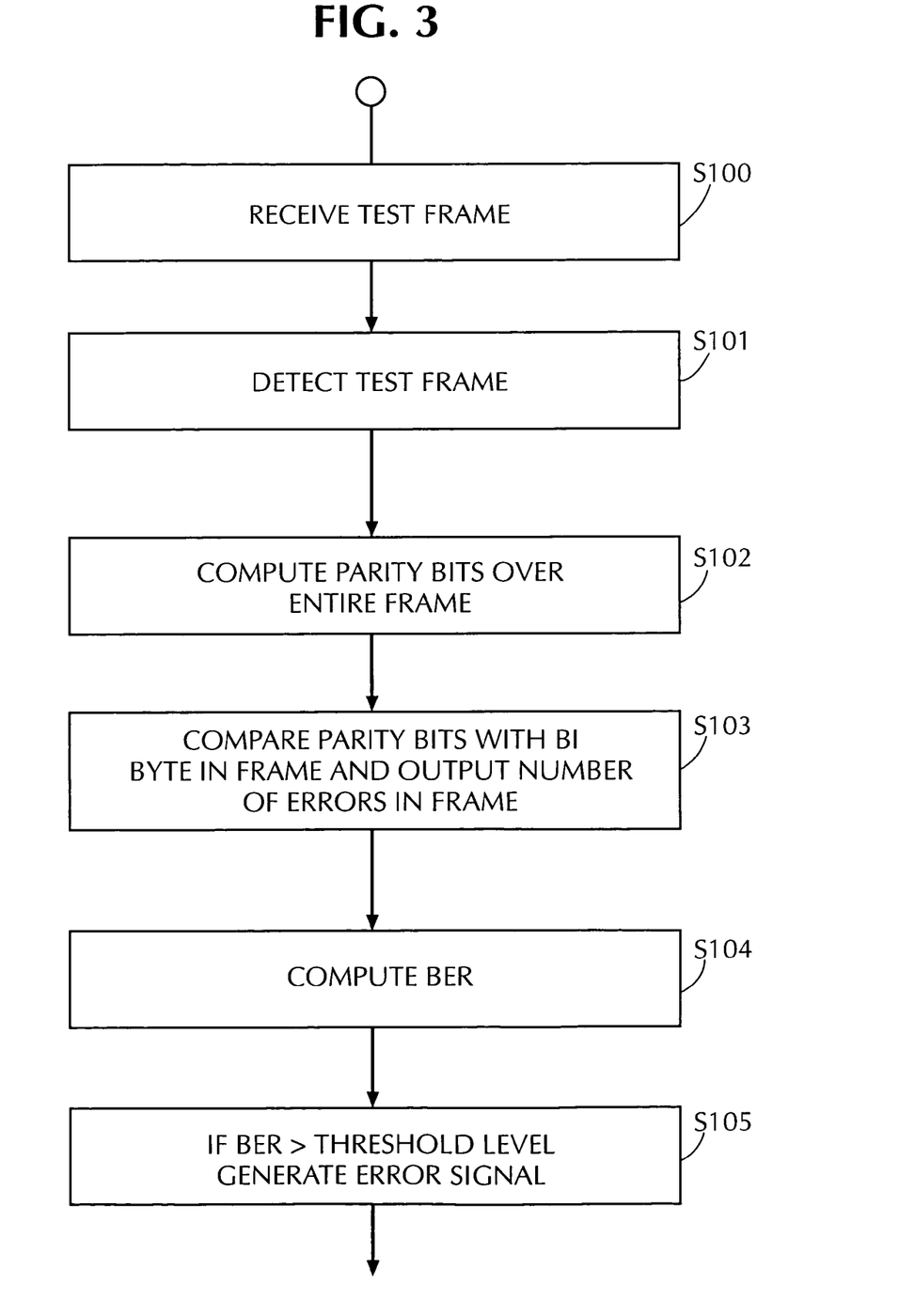
FIG. 3 is a flow chart showing the operation of the Monitoring Circuit of FIG. 1.

FIG. 3 is a flow chart illustrating the method of operation of a MC such as the MCs 20 and 22 in the transponder 4 of the OLT 2 of FIG. 1. At step S100 a receiver in the transponder receives a signal from the multiplexer/demultiplexer, and the test pattern (selected frame) is detected in step S101. At step S102 parity bits are computed over the entire frame, and at step S103 the parity bits are compared with the B1 BYTE in the frame, with the number of errors in the frame being output. The B1 BYTE is the result of a computation of a predetermined number of bytes in the frame, as is known in the art. At step S104 the bit error rate (BER) is computed based on the number of errors in the frame. If the BER is greater than a threshold level, an error signal is provided to the management interface controller 48 at step S105.

Figure 4:
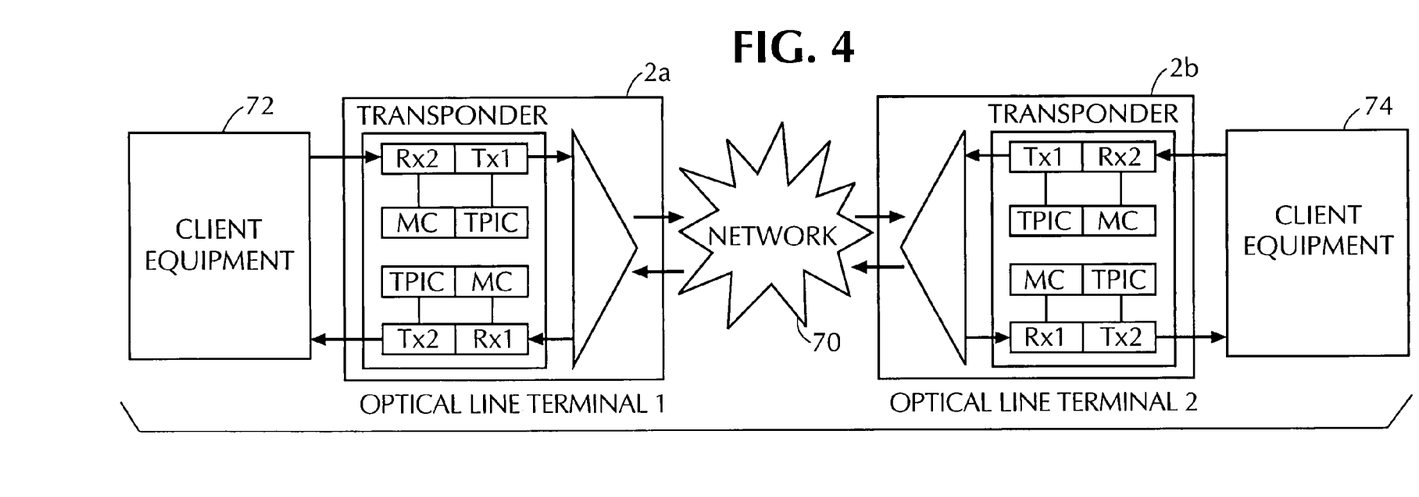
FIG. 4 illustrates two WDM optical line terminals of the type illustrated in FIG. 1 connected to an optical network.

FIG. 4 illustrates two WDM OLTs 2a and 2b of the type illustrated in FIG. 1 connected to an optical network 70. OLT 2a is, for example, disposed at one point on the network, while OLT 2b is disposed at another point on the network. Apparatus and methods of the present invention may be used to test a lightpath or communication link, of interest that extends across the network between OLT 2a and OLT 2b, without resort to any associated client equipment as previously required in the art. In practice, prior to OLT 2a being connected to client equipment 72 and OLT 2b being connected to client equipment 74, a lightpath extending between OLT 2a and OLT 2b may be tested through, for example, the combined use of the TPIC associated with OLT 2a and the MC associated with OLT 2b. On the transmit side at OLT 2a, the test pattern is injected into the transmitted signal and thus traverses the lightpath through network 70 to OLT 2b. The presence of the TPIC within the WDM system enables a transmitting WDM transponder to directly introduce such a test signal into the network. On the destination or receive side of the network at OLT 2b, the received signal is monitored for the transmitted test pattern, preferably through the transponder's MC. The MC, as described relative to FIG. 3, monitors the SONET B1 byte that enables a check of data parity. Signal monitoring is thus used to ensure that the tested connection yields a received signal of sufficient quality and integrity.

The test feature of the present invention is used at the time a connection is set up, for example, to verify the quality of the connection before additional equipment, such as client equipment, is attached. The present invention is particularly useful in attempting to determine whether a given fault condition is located within the associated network or external to a network. The testing feature may be used in combination with signal loopbacks along the lightpath to perform diagnostics on portions of the connections, whereby the transmitted signal having an injected test pattern therein is loopbacked by downstream equipment such that the transmitted signal may be received and monitored by the transmitting WDM system. Selection of the equipment that performs the signal loopback determines which portion of the connection is tested in this manner.

Figure 5:
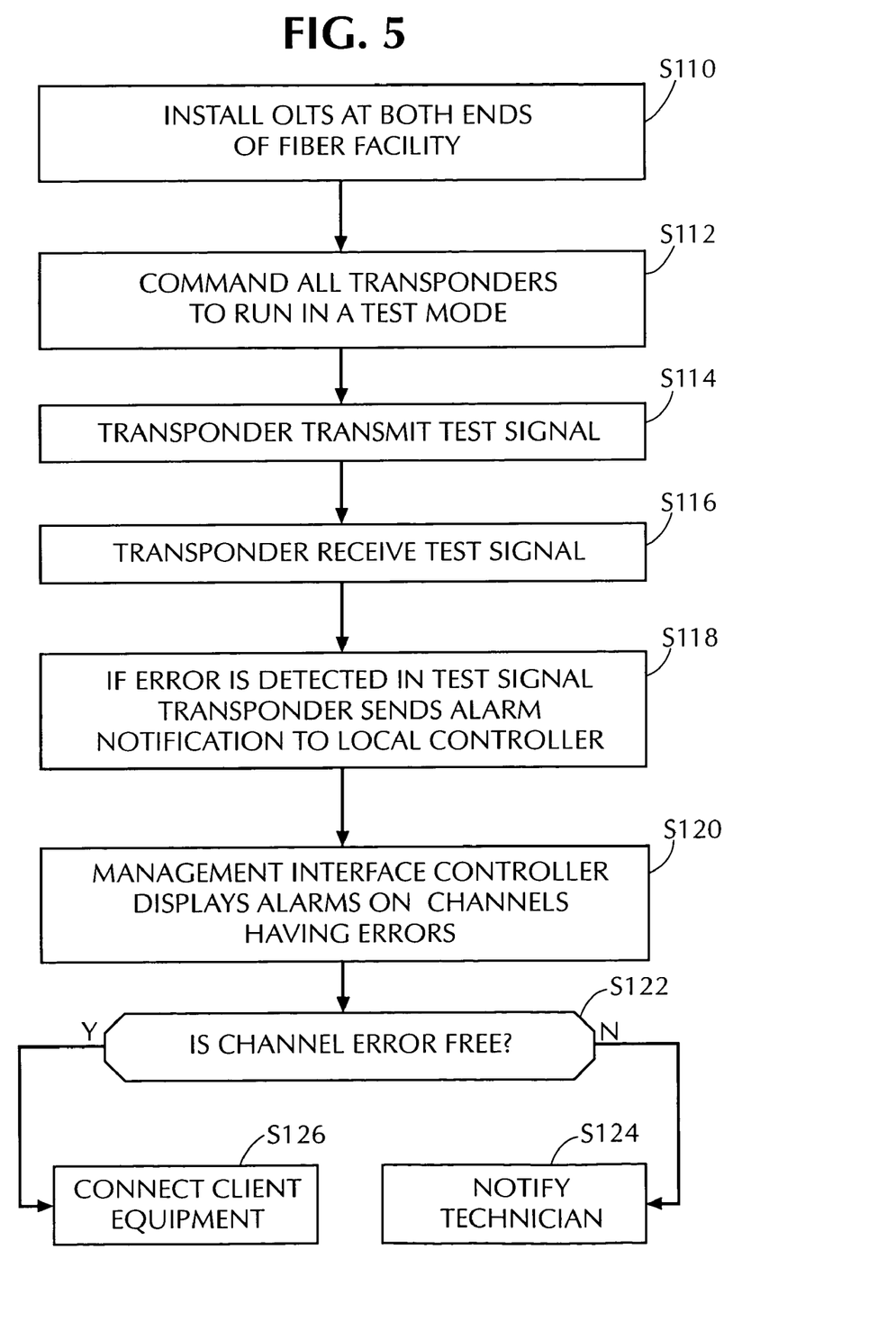
FIG. 5 is a flow chart of a self test method according to the invention.

FIG. 5 is a flowchart of the method used for self-test. At step S110 OLTs, such as OLTs 2a and 2b of FIG. 4, are installed at both ends of a fiber facility (network), and at step S112 all transponders in the OLTs are commanded to run in a test mode. At step S114 the transponders are turned on and start transmitting a test signal, and at step S116 transponders receive the test signal from the source. At step S118 a determination is made if there are errors in the received test signal, and if so an alarm notification is sent to the local management system controller. At step S120 the management system controller displays alarms for channels which exhibit an error. At step S122 a determination is made on a per channel basis as to whether or not an error exists. If an error exists at step S124 a status signal is generated which is indicative that a technician should be instructed to repair the inoperative channel. On the other hand, if a channel is operating correctly, client equipment is then connected as indicated at step S126.

Figure 6:
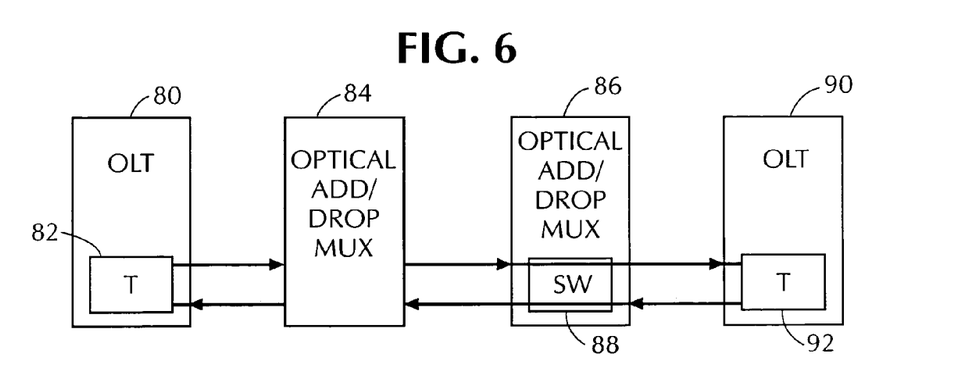
FIG. 6 illustrates a point-to-point WDM optical network configuration without loopback.
Figure 7:
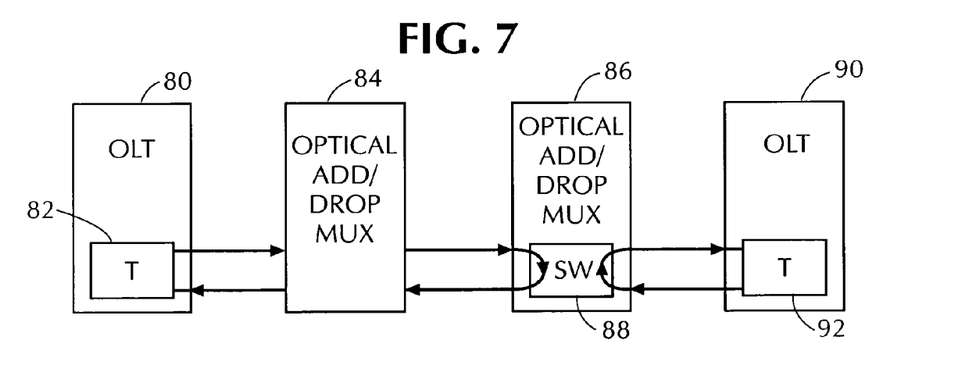
FIG. 7 illustrates the optical network configuration of FIG. 6 with loopback.

Another aspect of the present invention relates to WDM apparatus and methods that provide loopback functionality for optical network testing. FIGS. 6 and 7 illustrate an example of a point-to-point WDM network configuration that includes a plurality of optical nodes such as an OLT 80, including a transponder 82, an optical add/drop multiplexer 84, an optical add/drop multiplexer 86, including a loopback switch 88, and OLT 90 including a transponder 92. The loopback switch 88 in optical add/drop multiplexer 86 when in a normal mode allows westbound (right-to-left) traffic to flow through the device in a westbound direction, and similarly allows eastbound (left-to-right) traffic to flow through the device in an eastbound direction. However, when placed in a loopback mode as in FIG. 7, the switch 88 is used to redirect received traffic towards, for example, signal monitoring equipment within or proximate to the transmitting equipment. FIG. 7 illustrates such a loopback for eastbound traffic. In this way, that portion of the connection between OLT 80 and OLT 90 that extends between OLT 80 and optical add/drop multiplexer 86 can be tested for signal integrity and quality, thus facilitating isolation and localization of network faults. It is to be appreciated that a loopback switch may also be included in OLT 80, optical add/drop multiplexer 84 and OLT 90 to further isolate where a problem exists in the network. The loopback of the signal is accomplished without converting the optical signal to electrical form.

Figure 8A:
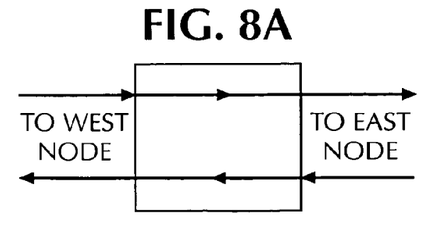
FIG. 8(a) illustrates an optical 2×2 switch in a non-loopback mode.
Figure 8B:
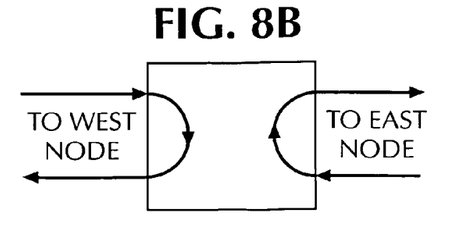
FIG. 8(b) illustrates an optical 2×2 switch in a loopback mode.

FIGS. 8(*a*) and 8(*b*) illustrate, on a per channel and per node basis, a preferred optical loopback arrangement for a WDM system that is based on an optical 2×2 switch. FIG. 8(*a*) depicts the switch in a non-loopback mode wherein traffic is not redirected for testing purposes, as in FIG. 6. FIG. 8(*b*), on the other hand, depicts the switch in a loopback mode, where both eastbound and westbound traffic are looped back for testing purposes as in FIG. 7.

Figure 9:
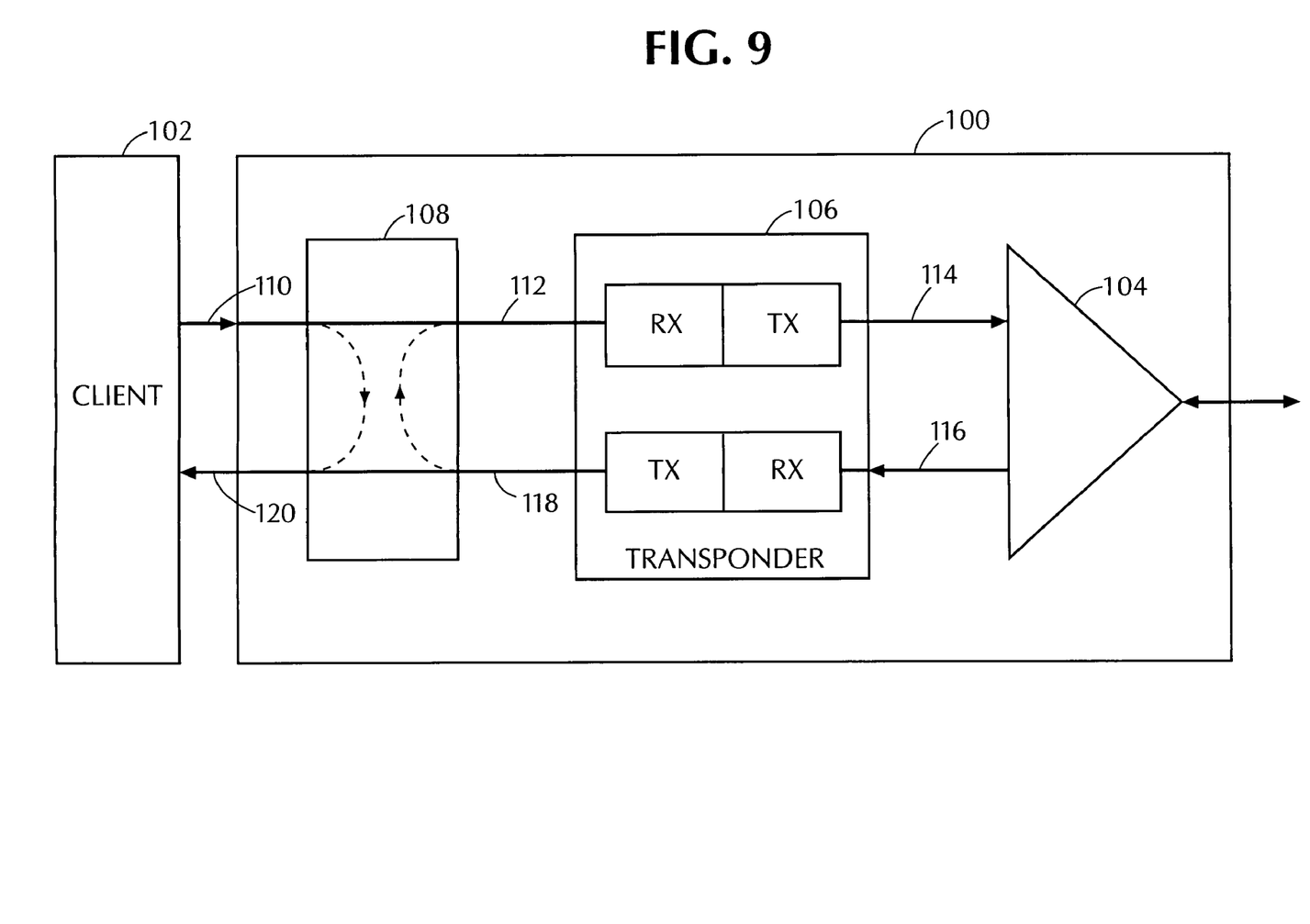
FIG. 9 is a block diagram illustrating loopback at a transponder using a 2×2 optical switch.

FIG. 9 is a block diagram illustrating loopback at a transponder using a 2×2 switch. An OLT 100 is connected to a client equipment 102. The OLT 100 includes a multiplexer/demultiplexer 104, transponder 106 and a 2×2 optical switch 108. When in a normal mode of operation, the switch 108 is as shown in FIG. 8(*a*) and a wavelength from client equipment 102 on line 110 passes through the switch to line 112 through the transponder 106 and via a line 114 to the multiplexer/demultiplexer 104 to be multiplexed with other wavelengths. A demultiplexed wavelength from the multiplexer/demultiplexer 104 is provided on a line 116 to the transponder 106 and then on line 118 to the switch 108 and via line 120 to the client equipment 102. When in the loopback mode of operation, the switch 108 is as shown in FIG. 8(*b*) and the wavelength on line 110 from client 102 is looped back through the switch 108 on the line 120 to client equipment 102. The output from the transponder on line 118 is looped back through the switch 108 to the line 112 to the transponder 106. In this way, a fault can be isolated between the client equipment 102 and the transponder 100. The loopback is accomplished without having to convert the optical wavelength to electrical form.

Figure 10:
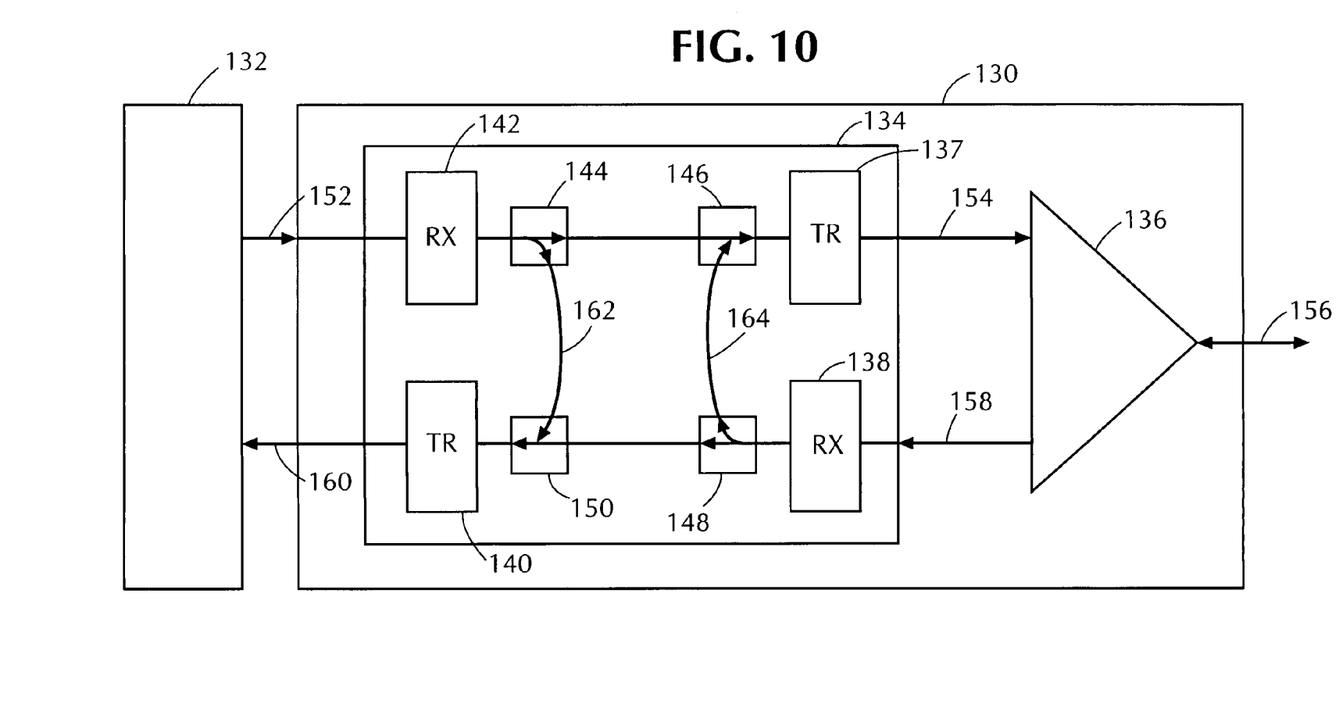
FIG. 10 is a block diagram illustrating loopback at a transponder using a different switch configuration.

FIG. 10 is a block diagram illustrating loopback at a transponder using a different switch configuration then is used in FIG. 9. An OLT 130 is connected to a client equipment 132. The OLT 130 includes a transponder 134 and a multiplexer/demultiplexer 136. The transponder 134 includes a transmitter 137, a receiver 138, a transmitter 140 and a receiver 142. The receiver 142 is connected to the transmitter 137 via a switch/bridge 144 and a selector 146. The receiver 138 is connected to the transmitter 140 via a switch/bridge 148 and a selector 150. In a normal mode of operation, a wavelength on line 152 from client equipment 132 is provided to the receiver 142, through the switch/bridge 144, the selector 146, the transmitter 137 and via line 154 to the multiplexer/demultiplexer 136 to be multiplexed with other wavelengths and output on line 156 to other WDM equipment. In the reverse direction, during the normal mode of operation a demultiplexed wavelength on line 158 is provided to the receiver 138, the switch/bridge 148, the selector 150, the transmitter 140 and via line 160 to the client equipment 132. In a loopback mode, the signal on line 152 from client equipment 132 passes through the receiver 142, the bridge 144 to selector 150 via the path 162 through the transmitter 140 and back to client equipment 132 via line 160. In the other direction, the wavelength on line 158 is applied via the receiver 138 to the switch/bridge 148 to the selector 146 via the path 164 and to the transmitter 137 and the line 154 to the multiplexer/demultiplexer 136. In this way, a fault can be isolated between the client equipment 132 and the OLT 130.

Figure 11A:
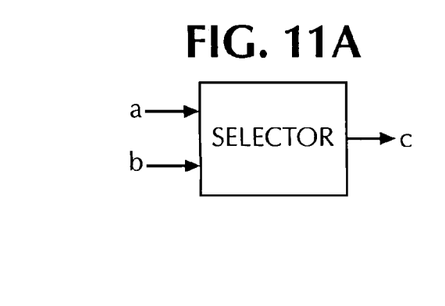
FIG. 11(a) illustrates a selector which may be used in FIG. 10.

The switch/bridge and selector elements shown in FIG. 10 are electrical elements and they are detailed below. FIG. 11(*a*) illustrates a selector in which an input a or b is selected and is output on a line c. This corresponds to the elements 146 and 150 in FIG. 10.

Figure 11B:
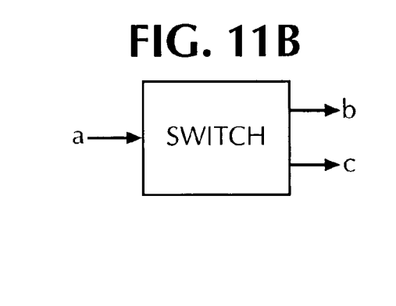
FIG. 11(b) illustrates a switch which may be used in FIG. 10.

FIG. 11(*b*) illustrates a switch in which an input a is output on line b or c. The switch may be used as the elements 144 and 148 in FIG. 10.

Figure 11C:
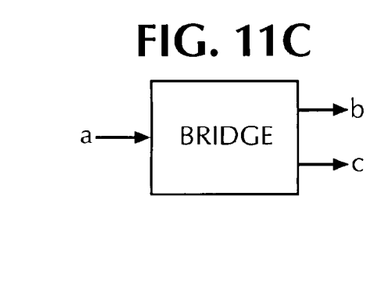
FIG. 11(c) illustrates a bridge which may be used in FIG. 10.

FIG. 11(*c*) illustrates a bridge in which a signal a is output at both points b and c. The bridge may also be used as the elements 144 and 148 in FIG. 10.

Figure 12:
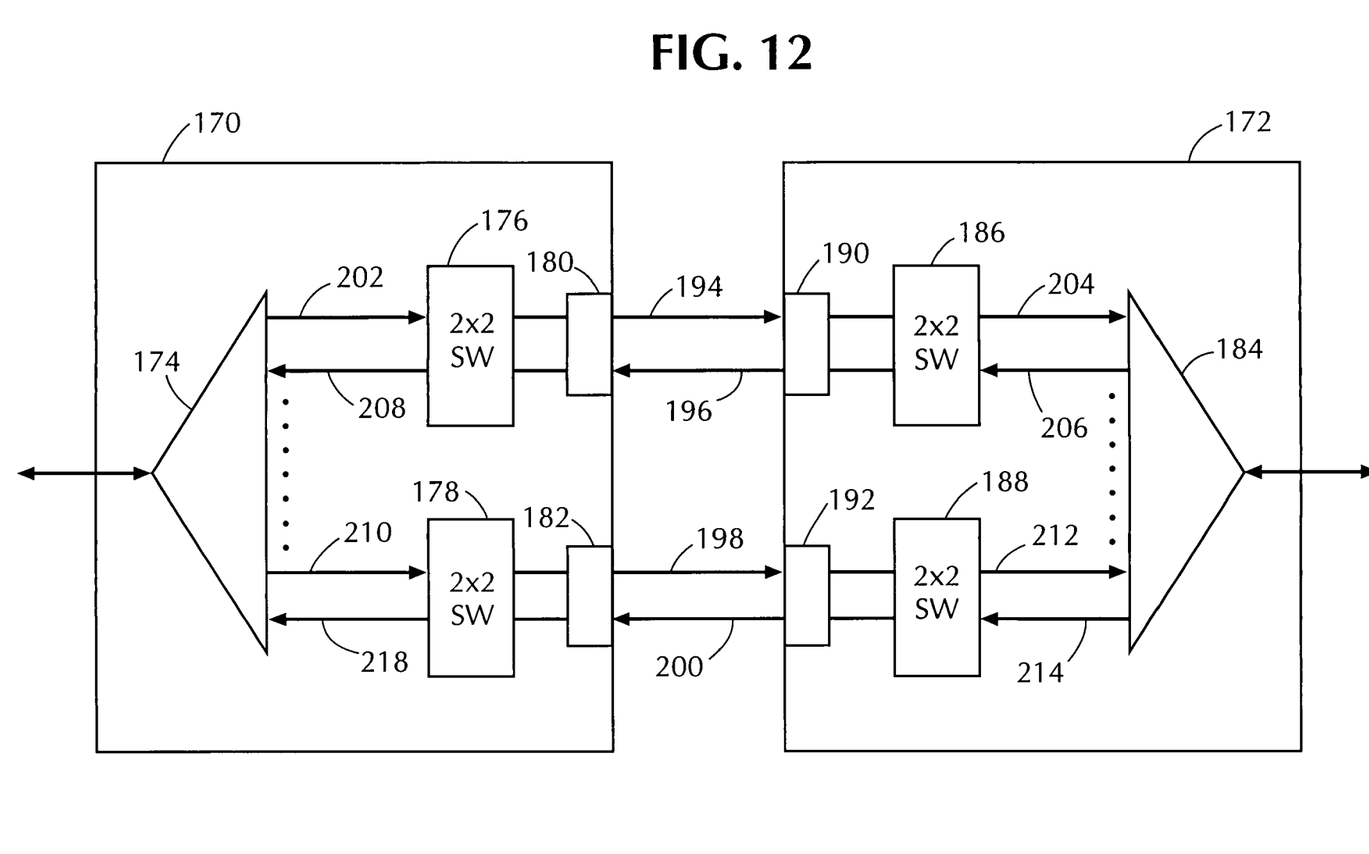
FIG. 12 illustrates two optical line terminals connected back-to-back with a loopback feature.

FIG. 12 illustrates 2 OLT terminals 170 and 172 connected back-to-back with a loopback feature. The OLT 170 includes a multiplexer/demultiplexer 174, 2×2 optical switches 176 and 178 and pass-through optical ports 180 and 182. Optical line terminal 172 includes a multiplexer/demultiplexer 184, 2×2 optical switches 186 and 188, and optical pass-through ports 190 and 192. Optical pass-through ports 180 and 190 are connected via optical fibers 194 and 196, and optical pass-through ports 182 and 192 are connected via optical fibers 198 and 200.

In a normal mode of operation a first demultiplexed wavelength on line 202 from the multiplexer/demultiplexer 174 of OLT 170 passes through the switch 176, the pass-through port 180 via line 194 to pass-through port 190 through switch 186 and via line 204 to multiplexer/demultiplexer 184. Likewise in the normal mode of operation the nth demultiplexed wavelength on line 210 from multiplexer/demultiplexer 174 passes through switch 178, pass-through port 182 via line 198 to pass-through port 192 of OLT 172 through switch 188 and via line 212 to multiplexer/demultiplexer 184. In a loopback mode in OLT 170, the wavelength on line 202 is loopbacked through switch 176 and line 208 to the multiplexer 174, and the wavelength on line 196 from OLT 172 is loopbacked through switch 176 via line 194 to the OLT 172. Likewise the nth wavelength on line 210 from multiplexer/demultiplexer 174 is separately loopbacked through the switch 178 via the line 218 to the multiplexer/demultiplexer 174, and the nth wavelength on line 200 is loopbacked through switch 178 to line 198 to the OLT 172. In this manner, faults can be isolated between the OLTs 170 and 172, without requiring conversion of the optical wavelength to electrical form.

In summary a method and apparatus has been disclosed for testing a WDM system without requiring connection to client equipment.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. A wavelength division multiplexed optical system, comprising:
    a first optical node including a transponder comprising a frame memory pre-stored with at least three pre-defined test frames including a valid working frame, a valid service frame, and an error frame, and also including a management interface controller adapted to selectively output from the frame memory one of the at least three test frames pre-stored in the frame memory as a test signal;
    a second optical node including a transponder having a monitoring circuit to monitor a received test signal; and
    a light path through which at least optical communications normally are exchanged between the first and second optical nodes,
    wherein the light path is tested by the monitoring circuit monitoring a bit error rate of the test signal in response to receiving the test signal from the first optical node through the light path.

2. The optical system of claim 1, wherein the valid working frame is a valid client signal.

3. The optical system of claim 2, wherein the valid client signal is one of a valid SONET frame, an ATM cell and an IP packet.

4. The optical system of claim 1, wherein the valid service frame is a valid maintenance signal.

5. The optical system of claim 4, wherein the valid maintenance signal is a SONET alarm indication signal.

6. The optical system of claim 1, wherein the light path is tested prior to connecting client equipment to the first and second optical nodes.

7. The optical system of claim 1, wherein the error frame includes predetermined errors.

8. The optical system of claim 1, further comprising client equipment connected to the first optical node, the client equipment normally exchanging optical communications with the first optical node, wherein the first optical node further includes a communications blocker which blocks the optical communications from being normally exchanged with the client equipment when the management interface controller outputs the test signal.

9. The optical system of claim 1, wherein the transponder of the first optical node also has another monitoring circuit to monitor a test signal received thereby, the transponder of the second optical node also comprises a test signal generator to output another test signal, and the monitoring circuit of the first optical node tests the light path by monitoring a quality of the test signal generated in the second optical node and provided to the monitoring circuit of the first optical node through the light path.

10. The optical system of claim 9, wherein the light path includes at least one loopback mechanism which directs the test signal outputted by one of the first and second optical nodes to the monitoring circuit of a same one of the first and second optical nodes, for monitoring therein.

11. The optical system of claim 10, wherein the light path also includes at least one other optical node, and the loopback mechanism is included in the at least one other optical node.

12. An optical line terminal comprising:
- a transponder including at least a transmitter, a receiver, a frame memory pre-stored with at least three predefined test frames including a valid working frame, a valid service frame, and an error frame, and a management interface controller adapted to selectively output from the frame memory one of the at least three test frames pre-stored in the frame memory as a test signal, the transponder also including a monitoring circuit connected to the receiver to monitor a bit error rate of a received test signal at an input of the receiver, wherein the transmitter transmits signals applied to an input of the transmitter; and
- a switch, operable either to couple a signal output by the receiver to the input of the transmitter, or to couple the test signal to the input of the transmitter.

13. A wavelength division multiplexed optical system, comprising:
- an optical node including a transponder comprising a frame memory pre-stored with at least three predefined test frames including a valid working frame, a valid service frame, and an error frame, and a management interface controller adapted to selectively output from the frame memory one of the at least three test frames pre-stored in the frame memory as a test signal;
- client equipment including a monitoring circuit to monitor a received test signal; and
- an optical path through which at least optical communications normally are exchanged between the optical node and the client equipment,
- wherein the optical path is tested by monitoring a bit error rate of the test signal outputted by the optical node and received by the monitoring circuit of the client equipment through the optical path.

14. A method for operating a wavelength division multiplexed optical communication system, comprising:
- generating a test signal by selectively outputting from a frame memory one of at least three predefined test frames pre-stored in the frame memory, including a valid working frame, a valid service frame, and an error frame;
- transmitting the test signal generated in the generating from a first optical node to a second optical node by way of a light path through which at least optical communications normally are exchanged between the first and second optical nodes; and
- determining if there is a fault condition in the light path based on a bit error rate of the test signal received at the second optical node.

15. The method of claim 14, wherein the valid working frame is a valid client signal.

16. The method of claim 15, wherein the valid client signal is one of a valid SONET frame, an ATM cell and an IP packet.

17. The method of claim 14, wherein the valid service frame is a valid maintenance signal.

18. The method of claim 17, wherein the valid maintenance signal is a SONET alarm indication signal.

19. The method of claim 14, wherein the light path is tested prior to connecting client equipment to the first and second optical nodes.

20. The method of claim 14, wherein the error frame includes predetermined errors.

* * * * *